United States Patent [19]

Odaira et al.

[11] Patent Number: 4,992,494

[45] Date of Patent: Feb. 12, 1991

[54] HALOGEN-CONTAINING RESIN COMPOSITION

[75] Inventors: Shoji Odaira, Meiwa; Minoru Fukuda; Nobuo Kawashima, both of Kazo; Masato Saito, Kuki; Motoharu Nakanishi, Kazo, all of Japan

[73] Assignee: Ferro Corporation, Cleveland, Ohio

[21] Appl. No.: 452,980

[22] Filed: Dec. 19, 1989

Related U.S. Application Data

[63] Continuation of Ser. No. 200,769, Jun. 1, 1988, abandoned.

[51] Int. Cl.$^5$ .................. C08K 5/3492; C08K 5/17; C08K 5/09
[52] U.S. Cl. .................. 524/100; 524/238; 524/239; 524/399
[58] Field of Search ............... 524/100, 238, 239, 399, 524/535

[56] References Cited

U.S. PATENT DOCUMENTS

| 3,084,135 | 4/1963 | Schullin | 524/100 |
| 3,652,619 | 3/1972 | Jones | 524/239 |
| 4,418,168 | 11/1983 | Johnson | 524/568 |
| 4,425,280 | 1/1984 | Ho | 524/238 |
| 4,751,261 | 6/1988 | Miyata et al. | 524/567 |

FOREIGN PATENT DOCUMENTS 55047  5/1979  Japan .

Primary Examiner—John C. Bleutge
Assistant Examiner—David Buttner
Attorney, Agent, or Firm—Daniel J. Hudak Co.

[57] ABSTRACT

A halogen-containing resin composition comprising (A) 100 parts by weight of a halogen-containing resin, (B) 0.1 to 10 parts by weight of at least one amino acid zinc salt selected from glycine zinc salt and zinc glutamate, (C) 0.10 to 5 parts by weight of at least one carboxylic acid zinc salt selected from basic zinc salts of organic carboxylic acids, and optionally (D) 0.01 to 5 parts by weight of melamine.

7 Claims, No Drawings

HALOGEN-CONTAINING RESIN COMPOSITION

CROSS-REFERENCE

This application is a continuation of application Ser. No. 07/200,769 filed June 1, 1988, for "HALOGEN-CONTAINING RESIN COMPOSITION", Shoji Odaira et al, Inventor, now abandoned.

This invention relates to a halogen-containing resin composition, and more specifically, to a halogen-containing resin composition having excellent thermal stability, coloration inhibiting property and heat resistance.

Generally, halogen-containing resins, particularly vinyl chloride resins, are liable to undergo degradation by the action of heat and light, and consequently change in color, decompose, degrade in mechanical strength, and change or degrade in appearance. Accordingly, molded articles prepared from such halogen-containing resins have a reduced commercial value and also cannot withstand long-term use.

Japanese Laid-Open Patent Publication No. 55,047/1979 discloses that a composition having excellent thermal stability can be prepared by incorporating an amino acid metal salt or its derivative in a vinyl chloride resin, and shows that the amino acid metal salt or its derivative gives a composition having good processability as well as excellent thermal stability. The amino acid metal salts used in this technique are, for example, calcium and zinc salts, and have low biological toxicity. The composition disclosed has the advantage that it is maintained thermally stable for a very long period of time, and the rate of dechlorination is very slow. This patent document, however, fails to describe that the particle size of glycine zinc salt as the amino acid metal salt or the method of its preparation affects the thermal stability of a halogen-containing resin composition containing the glycine zinc salt.

It is an object of this invention to provide a novel halogen-containing resin composition.

Another object of this invention is to provide a halogen-containing resin composition having better thermal stability, heat resistance and coloration inhibiting property than a conventional halogen-containing resin composition containing only the amino acid metal salt or its derivative as a stabilizing component.

Still another object of this invention is to provide a halogen-containing resin composition having further improved moldability over a conventional halogen-containing resin composition containing only the amino acid metal salt or its derivative as a stabilizing component.

Further objects of this invention along with its advantages will become apparent from the following description.

According to this invention, these objects and advantages of the invention are firstly achieved by a halogen-containing resin composition (to be referred to as the "first compositions") comprising (A) 100 parts by weight of a halogen-containing resin,
(B) 0.1 to 10 parts by weight of at least one amino acid zinc salt selected from glycine zinc salt and zinc glutamate, and
(C) 0.01 to 5 parts by weight of at least one amino acid zinc salt selected from basic zinc salts or organic carboxylic acids.

Examples of the halogen-containing resin include polyvinyl halides, halogenated polyolefins, and halogen-containing copolymers such as polyvinylidene chloride, polyvinyl chloride, chlorinated polyethylene, chlorinated polypropylene, chlorinated polyvinyl chloride, polyvinyl bromide, polyvinyl fluoride, brominated polyethylene, chlorinated rubbers, vinyl chloride/vinyl acetate copolymer, vinyl chloride/ethylene copolymer, vinyl chloride/propylene copolymer, vinyl chloride styrene copolymer, vinyl chloride/isobutylene copolymer, vinyl chloride/vinylidene chloride copolymer, vinyl chloride/styrene/maleic anhydride terpolymer vinyl chloride/styrene/acrylonitrile terpolymer, vinyl chloride/butadiene copolymer, vinyl chloride/vinylidene chloride/vinyl acetate copolymer, vinyl chloride/acrylic ester copolymers, vinyl chloride/maleic ester copolymers and vinyl chloride, methacrylic acid copolymer; and blends of these halogen-containing resins with ABS resin, MBS resin, EVA resin, butadiene polymers, urethane polymers, vinyl acetate polymers, etc.

Especially preferred among them are polyvinyl chloride, chlorinated polyethylene, vinyl chloride/vinyl acetate copolymer, vinyl chloride/ethylene copolymer and a polymer blend of polyvinyl chloride with ABS resin, MBS resin, EVA resin or polyurethane.

Preferably, the glycine zinc salt and zinc glutamate may be those which contain zinc in an amount of 0.8 to 4 equivalents per equivalent of the carboxyl group of glycine or 0.5 to 4 equivalents per equivalent of the carboxy group of glutamic acid, especially preferably equal equivalent salts or basic salts between glycine or glutamic acid with zinc which contain about 1 to 2 equivalents of zinc per equivalent of the carboxy group of the amino acid.

The glycine zinc salt and zinc glutamate can be produced, for example, by a double decomposition method or a direct method.

The double decomposition method starts with dispersing of glycine or glutamic acid in a predetermined amount of water. An aqueous solution of sodium hydroxide is added to the amino acid dispersion in this state. The mixture is heated to 50° to 60° C. to prepare an aqueous solution of a sodium slat of the amino acid. While an aqueous solution of zinc sulfate is being gradually added dropwise to the aqueous solution, double decomposition is induced with stirring to form a zinc salt of the amino acid. Thereafter, ethanol is added to crystallize sodium sulfate. By filtration, a filtrate having the least possible amount of sodium sulfate is collected. The filtrate is allowed to stand for 20 hours to precipitate crystals of the amino acid zinc salt. The crystals are then dried at 110° C. for ten and odd hours to remove water completely and thus to give the amino acid zinc salt. In this method, the ratio of the amount of the amino acid to that of sodium hydroxide is preferably nearly equimolar. The concentration of sodium hydroxide in the aqueous solution, the concentration of zinc sulfate in the aqueous solution and the amount of ethanol may be properly determined by considering the convenience of the operation.

The direct method comprises adding zinc oxide to a stirred aqueous solution of the amino acid, maintaining the mixture at 70° to 80° C. for several hours, and drying the product at 110° C. to give the desired zinc salt of the amino acid. The concentration of the amino acid in the aqueous solution in this method may be properly determined by considering the convenience of the operation.

The glycine zinc salt and zinc glutamate are desirably used int he form of a finely pulverized powder.

The glycine zinc salt and zinc glutamate may be used singly or in combination.

The other zinc slat (C) used in the first composition of this invention is a basic zinc salt of an organic carboxylic acid, preferably one which contains zinc in a larger equivalent number than the equivalent number of the carboxyl group of the organic carboxylic acid.

The organic carboxylic acid constituting the basic zinc salt may preferably be, for example, a saturated or unsaturated mono- or poly-carboxylic acid having not more than 20 carbon atoms, especially preferably a saturated monocarboxylic acid containing 1 to 18 carbon atoms. The organic carboxylic acids may be linear or branched, and may further contain a substituent such as a hydroxyl group or a mercapto group.

Examples of the organic carboxylic acid include monocarboxylic acids such as formic acid, acetic acid, propionic acid, butyric acid, isobutyric acid, trimethylacetic acid, hexanoic acid, octanoic acid, decanoic acid, lauric acid, tridecanoic acid, 2-ethylhexoic acid, nonanoic acid, benzoic acid, butylenzoic acid, toluic acid, cinnamic acid, phenylacetic acid, hydroxyacetic glycolic acid, lactic acid, hydroacrylic acid, propionic acid, methacrylic acid, 12-hydroxystearic acid, oleic acid, linoleic acid, linolenic acid, toll fatty acid, Versatic acid, thioglycolic acid and mercaptopripionic acid; and dicarboxylic acids such as oxalic acid, malonic acid, succinic acid, glutaric acid, adipic acid, pimelic acid, maleic acid, azelaic acid, levulinic acid, phthalic acid, fumaric acid and malic acid.

The basic zinc salt may be produced easily by reacting zinc oxide in a larger equivalent number than the equivalent number of the carboxyl group of the organic carboxylic acid with the organic carboxylic acid. Specifically, a carboxylic acid or an aqueous solution of a carboxylic acid and an aqueous dispersion of zinc oxide are separately prepared, and then mixed with each other gradually with stirring. As required, the stirring may be carried out at an elevated temperature. It may be carried out at room temperature. The reaction product is obtained during stirring for several tens of minutes. It was dried by heating. The finally obtained solid product is desirably used in a form as finely divided as possible.

Zinc oxide is used in an amount of, for example, 1.01 to 4 equivalents per equivalent of the carboxyl group of the organic carboxylic acid.

In the first composition of this invention, one or more of the basic zinc salts (C) may be used.

The glycine zinc salt and zinc glutamate (B) in the first composition of this invention, when incorporated singly in the halogen-containing resin, exhibits the function of a heat stabilizer. On the other hand, the basic zinc salt (C) is incorporated in combination with the glycine zinc salt and/or zinc glutamate. It facilitates the heat stabilizing function of the glycine zinc salt and/or zinc glutamate and also has the function of acting as a substitute of the glycine zinc salt and/or zinc glutamate.

The first composition of this invention comprises 100 parts by weight of the halogen-containing resin composition, 0.1 to 10 parts by weight, preferably 0.3 to 5.0 parts by weight, of at least one zinc salt (first zinc salt) selected from the group consisting of glycine zinc salt and zinc glutamate and 0.01 to 5 parts by weight, preferably 0.1 to 3.0 parts by weight, of a basic zinc salt (second zinc salt) of an organic carboxylic acid.

The first composition of this invention has excellent thermal stability, heat resistance and coloration inhibiting property.

According to this invention, there is provided a second composition comprising the first composition and 0.01 to 5 parts by weight of melamine.

Thus, the second composition of this invention comprises (A) 100 parts by weight of a halogen-containing resin, (B) 0.1 t 10 parts by weight of at least one amino acid zinc salt selected from glycine zinc salt and zinc glutamate, (C) 0.01 to 5 parts by weight of at least one carboxylic acid zinc salt selected from basic zinc salts of organic carboxylic acids, and (D) 0.01 to 5 parts by weight of melamine.

The components (A), (B) and (C) are as described hereinabove with regard to the first composition.

Another component of the second composition of this invention is melamine (D). Desirably, melamine (D) is used as a fine powder having an average particle diameter of, for example, not more than 10 micrometers. By so doing, the melamine can be uniformly dispersed in the composition.

The second composition contains 0.01 to 5 parts by weight, preferably 0.03 to 2.0 parts by weight, of melamine in addition to the components of the first composition.

The second composition further improves the excellent properties of the first composition of this invention.

It has been found in accordance with this invention that glycine zinc salt as the first zinc salt (B) has the property of imparting particularly noticeable thermal stability to the halogen-containing resin.

Specifically, it has been found in accordance with this invention that if the glycine zinc salt is prepared as fine particles having an average particle diameter of not more than 10 micrometers, or it is prepared as a neutral or basic glycine zinc salt by reacting a mixture of 1 mole of glycine, 0.5 3 moles of zinc oxide or zinc hydroxide and not more than 2 moles of water with stirring, a halogen-containing resin having excellent heat resistance can be obtained without using the component (C) in the first composition or the components (C) and (D) of the second composition.

Thus, according to this invention, there are further provided a third composition comprising (A) 100 parts by weight of a halogen-containing resin and (B)' 0.1 to 10 parts by weight of glycine zinc salt having a particle diameter of not more than 10 micrometers; and a fourth composition comprising (A) 100 parts by weight of a halogen-containing resin, and (B)" 0.1 to 10 parts by weight of neutral or basic glycine zinc salt obtained by reacting a mixture of 1 mole of glycine, 0.5 to 3 moles of zinc oxide or zinc hydroxide and not more than 2 moles of water with stirring.

The glycine zinc salt having an average particle diameter of not more than 10 micrometers used in the third composition does not depend upon the method of its production and should only meet the particle size requirement described above. It may be produced, for example, by first preparing glycine zinc salt particles by the method described above with regard to component (B) of the first composition or by reacting 1 mole of glycine and 0.5 mole of zinc oxide in a large amount of water with boiling and recrystallizing the product [B. W. Low, P. L. Hirshfeld, F. M. Richards et al. J. Am. Chem. Soc. 81, 4412 (1959)]; and then pulverizing the resulting particles by an ordinary commercial micropulverizer such as an impact pulverizer, a vibratory ball mill, a jet pulversizer, a tower pulverizer, a colloid mill or a wet pulversizer. To obtain the desired particle diameter, the pulverizing may be repeated, or the pulverizing time may be prolonged. If desired, the impact pulverizer, the wet pulverizer and the jet pulverizer may be used in combination.

Preferably, the glycine zinc salt obtained in the third composition obtained in the third composition has a particle diameter of not more than 10 micrometers and at least 70% of it consists of particles having a particle diameter of not more than 10 micrometers.

The glycine zinc salt used in the fourth composition is produced by a method which is characteristic in that a predetermined amount of glycine and zinc oxide or zinc hydroxide are reacted with stirring in the presence of a very small amount of water as stated above. When zinc hydroxide is used, the amount of water used may be not more than 1 mole. This reaction can be carried out, for example, by mixing and stirring predetermined amounts of glycine and zinc oxide or zinc hydroxide, adding a predetermined amount of water, and continuing the mixing. Usually, the reaction ends within 30 minutes after addition of water, but the reaction time required may be longer depending upon the stirring conditions and the basicity of the reaction mixture. After the reaction, the reaction product is dried at about 110° C. and pulverized.

In the third and fourth compositions, the glycine zinc salt is included preferably in an amount of 0.1 to 10 parts by weight per 100 parts by weight of the halogen-containing resin.

The compositions of this invention may further include various substances which are not normally added to halogen-containing resin in addition to the components described above. Such substances include, for example, organometallic compounds, organic phosphites, antioxidants, beta-diketone compounds, epoxy compounds, ultraviolet stabilizers, antistatic agents, surface-active agents, hydrotalcite compounds, polyol compounds, esters of polyol compounds, organic phosphate salts, metal oxides, metal hydroxides, basic inorganic acid salts, perchloric acid salts, plasticizers, pigments, lubricants, fluorescence agents, processing aids, blowing agents and fire retardants.

The mixed products of hydrotalcites and perchloric acid or acid-treated products thereof disclosed in Japanese Laid-Open patent publications Nos. 140,261/1984, 81,462/1986 and 83,245/1986 may also be used.

The aforesaid various stabilizers may be added to the halogen-containing resin by any methods which do not impair the function of the stabilizers.

The compositions of this invention may be produced by mixing and kneading the individual components at a temperature which is at lest higher than the temperature at which the halogen-containing resin melts.

Investigations of the present inventors have shown in regard to the second composition of this invention that if the basic zinc salt of an organic carboxylic acid, melamine and as required, an antioxidant, a lubricant, etc. are caused to be present in the reaction system or the pulverization system in which the glycine zinc salt or zinc glutamate is produced, and a mixture of these components is first prepared and then mixed with the halogen-containing resin, the resulting second composition shows a better state of dispersion of the individual components and better exhibits the effects of the present invention.

The following Examples illustrates the present invention in greater detail. It should be understood that these examples are for the purpose of illustrating the invention and never reduces the scope of the invention.

The various components used in Examples 1 to 3 were produced by the following procedures.

(1) Glycine zinc salt (by the direct method)

A reactor was charged with 300 ml of water and 75 g (1 mole) of glycine, and with stirring, 40.7 g (0.5 mole) of zinc oxide was added. The mixture was heated to 70° C., and maintained at this temperature for 1 hour. The reaction mixture was dried at 110° C. to remove water and obtain crystals. They were finely pulverized to an average particle diameter of 10 micrometers, and mixed with a halogen-containing resin.

(2) Zinc glutamate (by the direct method)

A reactor was charged with 300 ml of water and 294 g (2.0 moles) of glutamic acid, and with stirring, 81.4 g (1 mole) of zinc oxide was added. The mixture was heated to 70° C. and maintained for about 1 hour. Then, the reaction mixture was dried at 110° C. and finely divided, and mixed with a halogen-containing resin.

(3) Preparation of basic organic zinc compounds

Water (150 ml) was added to 81.4 g (1 mole) of zinc oxide, and with stirring, 67 g (1 mole as acetic acid) of a 90% aqueous solution of acetic acid was added gradually. After the acetic acid solution was all added, the mixture was further stirred for 30 minutes. The mixture was then dried and pulverized.

When acetic acid was used as the carboxylic acid as above, the reaction of it with zinc oxide was carried out at room temperature. If higher carboxylic acids are used, the reaction was carried out at elevated temperatures.

The basicity of the product was adjusted by the mole ratio of zinc oxide to the carboxylic acid. The mole ratio was prescribed as shown in Table 1.

TABLE 1

| Compound | Zinc oxide (moles) | Carboxylic acid I (moles) | II (moles) |
|---|---|---|---|
| A | 1 | acetic acid 1.0 | |
| B | 1 | benzoic acid 1.0 | |
| C | 1 | 2-ethylhexoic acid 1.65 | |
| D | 1 | acetic acid 0.5 | maleic anhydride 0.25 |
| E | 1 | acetic acid 1.0 | lauric acid 0.2 |
| F | 1 | benzoic acid 1.0 | 2-ethylhexoic acid 0.3 |
| G | 1 | maleic anhydride 0.5 | 12-hydroxy-stearic acid 0.5 |
| H | 1 | acetic acid 1.0 | adipic acid 0.3 |

As a measure of thermal stability, the test sample was ut in a Geer's oven at a predetermined temperature, and the degree of discoloration after the lapse of a predetermined period of time was determined. The degree of discoloration was evaluated by visual observation in accordance with the standards shown in Table 2.

TABLE 2

| Degree of discoloration | Color |
| --- | --- |
| 1 | white |
| 2 | pale yellow |
| 3 | yellow |
| 4 | pale brown |
| 5 | brown |
| 6 | fairly dark brown |
| 7 | black |

EXAMPLE 1

Runs Nos. 1 to 12 shown in Table 3 were carried out in accordance with the following formulation.

| Ingredients | Parts by weight |
| --- | --- |
| Polyvinyl chloride (PVC for short; Geon 103EP) | 100 |
| Idoctyl phthalate (DOP for short) | 40 |
| Zinc stearate | 0.2 |
| Calcium stearate | 0.1 |
| Bisphenol A | 0.1 |
| Diphenyl monodecyl phosphite | 0.1 |
| Glycine zinc salt synthesized in (1) | (see Table 3) |
| Zinc glutamate synthesized in (2) | (see Table 3) |
| Basic organic zinc compound (indicated as basic zinc in Table 3) | (see Table 3) |

The above ingredients were mixed by a high-speed rotating mixer, and kneaded by a roll heated at 170° C. for 4 hours to form a sheet having a thickness of 0.5 mm. The sheet was put in a Geer's oven at 180° C., taken out after the lapse of a predetermined period of time, and observed for thermal changes. The results are shown in Table 3.

TABLE 3

| | Amount added (parts by weight) | | Degree of discoloration at the following time (minutes elapsed) | | | | | | | |
| --- | --- | --- | --- | --- | --- | --- | --- | --- | --- | --- |
| | Glycine zinc salt (1) | | | | | | | | | |
| Run No. | Zinc glutamate (2) | Basic Zinc | 10 | 20 | 30 | 40 | 50 | 60 | 70 | 80 |
| 1 | 1.5 (1) | — | 3 | 3 | 4 | 4 | 6 | 8 | 9 | 10 |
| 2 | 1.5 (1) | 0.4 A | 1 | 1 | 1 | 1 | 2 | 2 | 2 | 2 |
| 3 | 1.5 (1) | 0.4 B | 1 | 1 | 1 | 1 | 2 | 2 | 3 | 4 |
| 4 | 1.5 (1) | 0.4 C | 1 | 1 | 1 | 2 | 2 | 2 | 3 | 4 |
| 5 | 1.5 (1) | 0.4 D | 1 | 1 | 1 | 2 | 2 | 3 | 3 | 4 |
| 6 | 1.5 (1) | 0.4 E | 1 | 1 | 1 | 2 | 2 | 3 | 3 | 4 |
| 7 | 1.2 (1) | 0.3 A | 1 | 1 | 1 | 1 | 2 | 2 | 3 | 4 |
| 8 | 1.2 (1) | 0.3 F | 1 | 1 | 1 | 2 | 2 | 2 | 3 | 4 |
| 9 | 1.2 (1) | 0.3 G | 1 | 1 | 1 | 2 | 2 | 3 | 3 | 4 |
| 10 | 1.2 (1) | 0.3 H | 1 | 1 | 1 | 2 | 2 | 3 | 3 | 4 |
| 11 | 1.2 (2) | 0.3 A | 1 | 1 | 1 | 1 | 2 | 3 | 4 | 4 |
| 12 | 0.6 (1), 0.6 (2) | 0.3 A | 1 | 1 | 1 | 1 | 2 | 2 | 2 | 3 |

EXAMPLE 2

Runs Nos. 13 to 19 shown in Table 4 were carried out in accordance with the following formulation.

| Ingredient | Parts by weight |
| --- | --- |
| PVC (Geon 103EP-8) | 100 |
| Zinc stearate | 0.5 |
| Calcium stearate | 0.2 |
| Dehydroacetic acid | 0.05 |
| BHT | 0.1 |
| Poly(dipropylene glycol) | 0.3 |
| phenyl phosphite | |
| Glycine zinc salt synthesized in (1) | (see Table 4) |
| Zinc glutamate synthesized in (2) | (see Table 4) |
| Basic organic zinc compound (indicated as basic zinc in Table 4) | (see Table 4) |

The above ingredients were mixed by a high-seed rotating mixer, and kneaded by a roll heated at 180° C. for 4 minutes to form a sheet having a thickness of 0.5 mm. The sheet was put in a Geer's oven at 180° C., taken out after the lapse of a predetermined period of time, and observed for thermal changes. The results are shown in Table 4.

TABLE 4

| | Amount added (parts by weight) | | Degree of discoloration at the following time (minutes elapsed) | | | | | | | |
| --- | --- | --- | --- | --- | --- | --- | --- | --- | --- | --- |
| | Glycine zinc salt (1) | | | | | | | | | |
| Run No. | Zinc glutamate (2) | Basic Zinc | 10 | 20 | 30 | 40 | 50 | 60 | 70 | 80 |
| 13 | 1.5 (1) | — | 3 | 3 | 4 | 4 | 5 | 5 | 6 | 7 |
| 14 | 1.5 (1) | 0.4 A | 1 | 1 | 1 | 2 | 2 | 3 | 3 | 4 |
| 15 | 1.5 (1) | 0.4 B | 1 | 1 | 1 | 2 | 3 | 3 | 3 | 4 |
| 16 | 1.5 (1) | 0.4 C | 1 | 1 | 1 | 2 | 3 | 3 | 4 | 5 |
| 17 | 1.5 (1) | 0.4 D | 1 | 1 | 2 | 2 | 3 | 3 | 4 | 5 |
| 18 | 0.8 (1), 0.7 (2) | 0.4 A | 1 | 1 | 1 | 2 | 2 | 3 | 3 | 4 |
| 19 | 1.5 (2) | 0.4 E | 1 | 1 | 1 | 2 | 2 | 3 | 4 | 5 |

A comparison of Run No. 1 with Runs Nos. 2 to 6 in Table 3 shows the effect of addition of the basic organic zinc compound based on 1.5 parts by weight of the glycine zinc salt. The composition of the basic organic zinc compounds hardly changes the effect, and clearly, the basic organic zinc compounds show the function of facilitating thermal stabilization. A comparison of Run No. 1 with Runs Nos. 7 to 10 in Table 3 shows that even when the amount of the amino acid zinc salt is decreased, but the amount of the basic organic zinc compound makes up for it, the amino acid zinc salt exhibits a stabilizing effect. In this case, the basic organic zinc compound performs the substituting function.

Runs Nos. 11 and 12 in Table 3 shows that even when the type of the amino acid zinc salt is different, a complementary relation is established between the amino acid zinc salt and the basic organic zinc compound.

Runs Nos. 13 to 19 in Table 4 show much the same results as in Table 3.

EXAMPLE 3

Runs Nos. 20 to 29 shown in Table 5 were carried out in accordance with the following formulation.

| Ingredient | Parts by weight |
| --- | --- |
| PVC (Geon 103EP) | 100 |
| DOP | 50 |
| Zinc stearate | 0.5 |
| Calcium stearate | 0.3 |
| BHT | 0.1 |
| Diphenyl monodecyl phosphite | 0.1 |
| Substances shown in Table 5 | (see Table 5) |

The above ingredients were fully mixed, and the resulting mixture was kneaded for about 4 minutes by a 6-inch×6 inch roll heated at 170° C. The kneaded mixture was formed into a sheet having a thickness of 0.5 to 0.7 mm. A part of the sheet was heated to 185° C. in a Geer's aging tester. It was taken out every 10 minutes and observed for the state of its discoloration. The results are shown in Table 5.

TABLE 5

| Run No. | Amount (parts by weight) and type of the amino acid zinc salt | Amount (parts by weight) and type of the basic carboxylic acid zinc salt | Amount parts by weight) of melamine | Degree of discoloration at the following time (minutes) elapsed |||||||| 
|---|---|---|---|---|---|---|---|---|---|---|---|
| | | | | 10 | 20 | 30 | 40 | 50 | 60 | 70 | 80 |
| 20 | 1.5 (1) | — | — | 2 | 3 | 3 | 4 | 5 | 6 | 6 | 6 |
| 21 | 1.5 (1) | 0.3 (A) | — | 1 | 2 | 2 | 3 | 4 | 4 | 5 | 6 |
| 22 | 1.5 (1) | 0.3 (A) | 0.5 | 1 | 1 | 1 | 2 | 3 | 3 | 4 | 4 |
| 23 | 1.5 (1) | 0.3 (A) | 1.0 | 1 | 1 | 1 | 2 | 2 | 3 | 4 | 4 |
| 24 | 1.5 (1) | 0.3 (C) | 0.5 | 1 | 1 | 2 | 2 | 3 | 3 | 4 | 4 |
| 25 | 1.5 (2) | 0.3 (A) | 0.5 | 1 | 1 | 1 | 2 | 3 | 3 | 4 | 4 |
| 26 | 1.5 (1) | 0.3 (I) | 0.2 | 1 | 1 | 2 | 2 | 3 | 3 | 4 | 5 |
| 27 | 1.5 (1) | 0.3 (B) | 0.2 | 1 | 1 | 1 | 2 | 3 | 4 | 4 | 5 |
| 28 | 1.5 (1) | 0.5 (I) | 0.5 | 1 | 1 | 1 | 2 | 2 | 3 | 3 | 4 |
| 29 | 1.5 (1) | 0.3 (J) | 0.2 | 1 | 1 | 2 | 2 | 3 | 3 | 4 | 4 |

(1) and (2) in the column of the amino acid zinc salt and (A), (B) and (C) in the column of the basic organic zinc salt have the same meanings as described hereinabove. Symbol (I) refers to the reaction product of 1.5 moles of zinc oxide and 1 mole of maleic anhydride, and symbol (J) refers to the reaction product of 1 mole of zinc oxide and 1 mole of malic acid. The measure of the degree of discoloration is the same as in Table 2.

A comparison of Runs Nos. 1 and 2 with Runs Nos. 3 to 10 in Table 5 shows that the further addition of melamine brings about a lesser degree of discoloration and a better heat stabilizing effect for a long period of time than in the case of adding the amino acid zinc salt alone or both the amino acid zinc salt and the basic organic acid zinc salt.

EXAMPLE 4

(1) Glycine zinc salt was prepared by the following procedure.

Glycine and zinc oxide or zinc hydroxide were put in predetermined amounts shown in Table 6 in a portable universal mixer (made by Shinagawa Seisakusho), and mixed for about 5 minutes. Then, when mixing, water in each of the amounts indicated in Table 6 was added to form glycine zinc salt. After 30 minutes after the addition of water, the entire system became whiter than in the initial stage of mixing. The stirring was therefore stopped at this time. The product was dried at 110° C., then finely pulverized and mixed with a halogen-containing resin.

In Table 6, groups A, B and C refer to the case where the proportion of water added was small, and groups A', B' and C', to the case where the proportion of water added was large. The proportions of the substances indicated in Table 6 are moles per mole of glycine.

TABLE 6

| Group | No. | Zinc oxide | Zinc hydroxide | Water |
|---|---|---|---|---|
| A | G1 | 0.5 | | 0.15 |
| | G2 | 0.5 | | 0.5 |
| | G3 | 0.5 | | 1.0 |
| | G4 | | 0.5 | 1.0 |
| A' | G5 | 0.5 | | 5.0 |

TABLE 6-continued

| Group | No. | Zinc oxide | Zinc hydroxide | Water |
|---|---|---|---|---|
| | G6 | 0.5 | | 10.0 |
| | G7 | 0.5 | | 20.0 |
| B | G8 | 0.75 | | 0.15 |
| | G9 | 0.75 | | 0.5 |
| | G10 | 0.75 | | 1.0 |
| | G11 | | 0.75 | 1.0 |
| B' | G12 | 0.75 | | 5.0 |
| | G13 | 0.75 | | 10.0 |
| | G14 | 0.75 | | 20.0 |
| C | G15 | 1.0 | | 0.15 |
| | G16 | 1.0 | | 0.5 |
| | G17 | 1.0 | | 1.0 |
| | G18 | | 1.0 | 0.5 |
| C' | G19 | 1.0 | | 5.0 |
| | G20 | 1.0 | | 10.0 |
| | G21 | 1.0 | | 20.0 |

(2) Halogen-containing resin composition

Runs Nos. 30 to 50 shown in Table 7 were carried out basically in accordance with the following formulation.

| Ingredient | Parts by weight |
|---|---|
| PVC (Geon 103EP-8) | 100 |
| Basic zinc acetate | 0.3 |
| BHT | 0.1 |
| Dehydroacetic acid | 0.05 |
| Zinc stearate | 0.5 |
| Calcium stearate | 0.3 |
| DHOP | 0.1 |
| Glycine zinc salt (see Table 7) | 1.6 |

The base zinc acetate above was prepared in the same way as in the preparation of the basic zinc acetate used in Example 1.

The above ingredients were mixed by a high-speed rotating mixer at 80° C. by spontaneous temperature elevation, and kneaded on a 6-inch roll at 190 C. for 4 minutes and processed into a sheet having a thickness of about 0.6 to 0.7 mm. The sheet was heated at 180° C. in a Geer's aging tester, and the time which lapsed until it became blackened was determined. The results are shown in Table 7.

TABLE 7

| Run No. | Glycine | zinc salt | Blackening time (minutes) |
| --- | --- | --- | --- |
| 30 | A | G1 | more than 90 |
| 31 |  | G2 | " |
| 32 |  | G3 | " |
| 33 |  | G4 | " |
| 34 | A' | G5 | more than 70 |
| 35 |  | G6 | " |
| 36 |  | G7 | " |
| 37 | B | G8 | more than 90 |
| 38 |  | G9 | " |
| 39 |  | G10 | " |
| 40 |  | G11 | " |
| 41 | B' | G12 | more than 70 |
| 42 |  | G13 | " |
| 43 |  | G14 | " |
| 44 | C | G15 | more than 80 |
| 45 |  | G16 | " |
| 46 |  | G17 | " |
| 47 |  | G18 | " |
| 48 | C' | G19 | more than 60 |
| 49 |  | G20 | " |
| 50 |  | G21 | " |

The difference in the method of preparing glycine zinc salt will become clear by comparing group A with Group A', group B with group B', and group C with group C'. It can specifically been seen that irrespective of whether the glycine zinc salt is neutral or basic, the amount of water added at the time of preparation is desirably not more than 2 moles per mole of glycine.

EXAMPLE 5

Runs Nos. 51 to 56 shown in Table 8 were carried out in accordance with the following formulation.

| Ingredient | Parts by weight |
| --- | --- |
| PVC (Geon 103EP) | 100 |
| DOP | 40 |
| Zinc stearate | 0.5 |
| Calcium stearate | 0.2 |
| BHT | 0.05 |
| Dehydroacetic acid | 0.05 |
| DHOP | 0.1 |
| Basic zinc acetate | 0.1 |
| Glycine zinc salt | (see Table 8) |

The basic zinc acetate was the same as that used in Example 1.

Glycine zinc salt was prepared by the following procedure. Glycine (300 g; 4 moles) and 162.8 g (2 moles) of zinc oxide were put in a portable universal mixer and mixed for about 5 minutes. Then 162.8 g (34 moles) of water was added, and the mixing was continued for about 1 hour. Then, the mixture was dried at 110° C. to obtain glycine zinc salt as crystals. The crystals were mechanically pulverized and observed under a scanning electron microscope. When the largest particle among those particles which appeared in the visual field has a particle diameter of 10 micrometer, it was determined that the crystals had been finely pulverized to an average particle diameter of not more than 10 micrometers. The above pulverization to an average particle diameter of not more than 10 micrometers was effected by using a jet pulverizer, and the pulverization was repeated.

When many particles having the maximum particle diameter of at least 10 micrometers were observed under the scanning electron microscope, it was determined that the average particle diameter of the pulverized powder was at least 10 micrometers. Particles having an average particle diameter of at least 10 micrometers were prepared by pulverizing the dried crystals of glycine zinc salt by a rotating pulversizer, and stopping the pulverization operation while many particles having a particle diameter of at least 10 micrometers remained.

The ingredients in the above-given formulation were mixed for about 1 minute by a rotating mixer, and kneaded by a 6-inch roll at 175° C. for 4 minutes and processed into a sheet having a thickness of 0.5 to 0.7 mm. The sheet was heated at 185° C. in a Geer's aging tester, and the time which elapsed until it discolored to an unusable degree was measured. The results are shown in Table 8.

TABLE 8

| Run No. | Particle diameter of glycine zinc salt (micrometers) | Proportion of glycine zinc salt added (parts by weight) | Discoloration time (minutes) |
| --- | --- | --- | --- |
| 51 | below 10 | 1.2 | 70 |
| 52 | below 10 | 3.0 | 90 |
| 53 | below 10 | 5.0 | above 100 |
| 54 | above 10 | 1.2 | 50 |
| 55 | above 10 | 3.0 | 70 |
| 56 | above 10 | 5.0 | 90 |

In Table 8, Runs Nos. 51 to 53 refer to the case where the glycine zinc salt was finely pulverized to a size of less than 10 micrometers, and Runs Nos. 54 to 56, to the case where the glycine zinc salt was pulverized to a size of more than 10 micrometers. The discoloration times are compared at the same proportion of the glycine zinc salt (Run No. 51 with Run No. 54, Run No. 52 with Run No. 55, and Run No. 53 with Run No. 56), the discoloration time became longer when particles having a size of less than 10 micrometers were added and the thermal stability was greatly improved.

We claim:

1. A halogen-containing resin composition comprising:
   100 parts by weight of a halogen-containing resin,
   0.1 to 10 parts by weight of at least one amino acid zinc salt selected from glycine zinc salt and zinc glutamate, and
   0.1 to 5 parts by weight of at least one carboxylic acid zinc salt selected from basic zinc salts of organic carboxylic acids wherein the organic carboxylic acids are selected from the group consisting of monocarboxylic acids and dicarboxylic acids wherein the monocarboxylic acids are selected from the group consisting of formic acid, acetic acid, propionic acid, butyric acid, isobutyric acid, trimethylacetic acid, hexanoic acid, octanoic acid, decanoic acid, aluric acid, tridecanoic acid, 2-ethylhexoic acid, nonanionic acid, benzoic acid, butylbenzoic acid, toluic acid, cinnamic acid, phenylacetic acid, hydroxyacetic acid, acrylic acid, crotonic acid, acetoacetic acid, glycolic acid, lactic acid, hydroacrylic acid, propionic acid, methylacrylic acid, 12-hydroxystearic acid, oldic acid, linoleic acid, linolenic acid, tall oil fatty acid, versatic acid, thioglycolic acid and mercaptopropionic acid; and wherein the dicarboxylic acids are selected from the group consisting of oxalic acid, malonic acid, succinic acid, glutaric acid, adipic acid, pimelic acid, maleic acid, azelaic acid, levulinic acid, phthalic acid, fumaric acid and malic acid.

2. The composition of claim 1 wherein the halogen-containing resin (A) is selected from the group consisting of polyvinyl chloride, chlorinated polyethylene, vinyl chloride/vinyl acetate copolymer and polymer blends formed between polyvinyl chloride and ABS resin, MBS resin, EVA resin or polyurethane.

3. The composition of claim 1 wherein the glycine zinc salt (B) contains 0.8 to 4 equivalents of zinc per equivalent of the carboxyl group of glycine.

4. The composition of claim 1 wherein the zinc glutamate (B) contains 0.5 to 4 equivalents of zinc per equivalent of the carboxyl group of glutamic acid.

5. The composition of claim 1 wherein the carboxylic acid zinc salt (C) contains 1.01 to 4 equivalents of zinc per equivalent of the carboxyl group of the carboxylic acid.

6. A halogen-containing resin composition comprising:
   100 parts by weight of a halogen-containing resin,
   0.1 to 10 parts by weight of at least one amino acid zinc salt selected from glycine zinc salt and zinc glutamate,
   0.1 to 5 parts by weight of at least one carboxylic acid zinc salt selected from basic zinc salts or organic carboxylic acids wherein the organic carboxylic acids are selected from the group consisting of monocarboxylic acids and dicarboxylic acids wherein the monocarboxylic acids are selected from the group consisting of formic acid, acetic acid, propionic acid, butyric acid, isobutyric acid, trimethylacetic acid, hexanoic acid, octanoic acid, decanoic acid, lauric acid, tridecanoic acid, 2-ethylhexoic acid, nonanoic acid, benzoic acid, butylbenzoic acid, toluic acid, cinnamic acid, phenylacetic acid, hydroxyacetic acid, acrylic acid, crotonic acid, acetoacetic acid, glycolic acid, lactic acid, hydroacrylic acid, propionic acid, methacrylic acid, 12-hydroxystearic acid, oleic acid, linoleic acid, linolenic acid, tall oil fatty acid, versatic acid, thioglycolic acid and mercaptopropionic acid; and wherein the dicarboxylic acids are selected from the group consisting of oxalic acid, malonic acid, succinic acid, glutaric acid, adipic acid, pimelic acid, maleic acid, azelaic acid, levulinic acid, phthalic acid, fumaric acid and malic acid, and
   0.01 to 5 parts by weight of melamine.

7. The composition of claim 6 wherein melamine (D) is a powder having an average particle diameter of not more than 10 micrometers.

* * * * *